(12) United States Patent
Alvarez-Icaza Rivera et al.

(10) Patent No.: US 10,204,118 B2
(45) Date of Patent: *Feb. 12, 2019

(54) MAPPING NEURAL DYNAMICS OF A NEURAL MODEL ON TO A COARSELY GRAINED LOOK-UP TABLE

(71) Applicant: INTERNATIONAL BUSINESS MACHINES CORPORATION, Armonk, NY (US)

(72) Inventors: Rodrigo Alvarez-Icaza Rivera, San Jose, CA (US); John V. Arthur, Mountain View, CA (US); Andrew S. Cassidy, San Jose, CA (US); Pallab Datta, San Jose, CA (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/197,599

(22) Filed: Jun. 29, 2016

(65) Prior Publication Data

US 2018/0113885 A1   Apr. 26, 2018

Related U.S. Application Data

(63) Continuation of application No. 14/690,326, filed on Apr. 17, 2015, now Pat. No. 9,424,284, which is a (Continued)

(51) Int. Cl.
*G06F 17/30* (2006.01)
*G06N 3/04* (2006.01)
(Continued)

(52) U.S. Cl.
CPC ........ *G06F 17/30292* (2013.01); *G06F 17/10* (2013.01); *G06N 3/04* (2013.01);
(Continued)

(58) Field of Classification Search
CPC .......... G06N 3/04; G06N 3/049; G06N 3/063; G06N 3/08
(Continued)

(56) References Cited

U.S. PATENT DOCUMENTS 6,463,425 B2   10/2002   Raz
6,999,953 B2    2/2006   Ovhsinsky
(Continued)

FOREIGN PATENT DOCUMENTS

EP         0560595 A2    9/1993

OTHER PUBLICATIONS

'Event driven simulation scheme for spiking neural networks using lookup tables to characterize neuronal dynamics': Ros, 2006, Neural Computing 18, 2959-2993, MIT, 2006.*
(Continued)

*Primary Examiner* — Robert A Cassity
*Assistant Examiner* — Peter Coughlan
(74) *Attorney, Agent, or Firm* — Sherman IP LLP; Kenneth L. Sherman; Hemavathy Perumal

(57) ABSTRACT

Embodiments of the invention relate to mapping neural dynamics of a neural model on to a lookup table. One embodiment comprises defining a phase plane for a neural model. The phase plane represents neural dynamics of the neural model. The phase plane is coarsely sampled to obtain state transition information for multiple neuronal states. The state transition information is mapped on to a lookup table.

15 Claims, 14 Drawing Sheets

1

$$dV/dt = f(V, h)$$

$$dh/dt = g(V, h)$$

$$\left.\begin{array}{l} V = V + dV*dt \\ h = h + dh*dt \end{array}\right\} s$$

Related U.S. Application Data continuation of application No. 13/725,442, filed on Dec. 21, 2012, now Pat. No. 9,053,429.

(51) Int. Cl.
| | |
|---|---|
| *G06N 3/063* | (2006.01) |
| *G06F 17/10* | (2006.01) |
| *G06N 3/08* | (2006.01) |

(52) U.S. Cl.
CPC ............. *G06N 3/049* (2013.01); *G06N 3/063* (2013.01); *G06N 3/08* (2013.01)

(58) Field of Classification Search
USPC .......................................................... 706/12
See application file for complete search history.

(56) References Cited

U.S. PATENT DOCUMENTS

| | | | |
|---|---|---|---|
| 7,574,409 B2 | 8/2009 | Patinkin | |
| 7,870,086 B2 | 1/2011 | Llinas et al. | |
| 7,908,235 B2 | 3/2011 | Snook et al. | |
| 8,200,593 B2 | 6/2012 | Guillen et al. | |
| 9,542,643 B2 | 1/2017 | Levin et al. | |
| 2011/0004579 A1* | 1/2011 | Snider | G06N 3/049 706/25 |
| 2012/0084241 A1* | 4/2012 | Friedman | G06N 3/049 706/27 |
| 2012/0109864 A1* | 5/2012 | Modha | G06N 3/063 706/25 |
| 2014/0180988 A1 | 6/2014 | Alvarez-Icaza Rivera et al. | |
| 2016/0034808 A1 | 2/2016 | Alvarez-Icaza Rivera et al. | |
| 2016/0358066 A1 | 12/2016 | Alvarez-Icaza Rivera et al. | |

OTHER PUBLICATIONS

U.S. Advisory Action for U.S. Appl. No. 15/239,642 dated Sep. 1, 2017.

U.S. Final Office Action for U.S. Appl. No. 15/239,642 dated Jun. 30, 2017.

Smith, L.S., "Implementing neural models in silicon", Doctoral Thesis, 2004, pp. 1-37, University of Stirling, United Kingdom.

U.S. Non-Final Office Action for U.S. Appl. No. 15/239,642 dated Mar. 9, 2017.

Alvado, L. et al., "Hardware Computation of Conductance-Based Neuron Models", Journal of Neurocomputing, Jun. 2004, pp. 109-115, vol. 58-60, Elsevier B.V., The Netherlands.

Marchesi, M. et al., "Fast Neural Networks Without Multipliers", IEEE Transactions on Neural Networks, Jan. 1993, pp. 53-62, vol. 4, No. 1, IEEE, USA.

Vogelstein, R.J. et al., "Dynamically Reconfigurable Silicon Array of Spiking Neurons with Conductance-Based Synapses", IEEE Transactions on Neural Networks, Jan. 2007, pp. 253-265, vol. 18, No. 1, IEEE, USA.

He, M. et al., "'Neural Network for Nanoscale Architecture'", Proceedings of the Sixth IEEE Conference onNanotechnology (IEEE-NANO '06), Jun. 2006, pp. 367-370, vol. 1, IEEE, USA".

Piazza, F. et al., "Neural Networks with Digital LUT Activation Functions", Proceedings of the 1993 IEEE International Joint Conference on Neural Networks (IJCNN '93), Oct. 1993, pp. 1401-1404, vol. 2, IEEE, USA.

Uncini, A. et al., "Fast Complex Adaptive Spline Neural Networks for Digital Signal Processing", Proceedings of the 1998 IEEE International Joint Conference on Neural Networks (IJCNN '98), May 1998, pp. 903-908, vol. 2, IEEE, USA.

Goldberg, D.H. et al., "Probablistic Synaptic Weighting in a Reconfigurable Network of VLSI Integrate-and-Fire Neurons", Journal of Neural Networks, Jul.-Sep. 2001, pp. 781-793, vol. 14, No. 6-7, Elsevier Science Ltd., United Kingdom.

Zou, Q. et al., "Real-time Simulations of Networks of Hodgkin-Huxley Neurons Using Analog Circuits", Journal of Neurocomputing, Jun. 2006, pp. 1137-1140, vol. 69, No. 10-12, Elsevier Science Publishers B.V., The Netherlands.

Vogelstein, R.J., et al., "Beyond Address-Event Communication", The Neuromorphic Engineer, 2004, pp. 1-3, Institute of Neuromorphic Engineering, USA.

Muthuramalingam, A. et al., "Neural Network Implementation Using FPGA: Issues and Application", International Journal of Information and Communications Engineering, 2008, pp. 86-92, vol. 4, No. 2, World Academy of Science, Engineering and Technology, USA.

Fiori, S., "Hybrid Independent Component Analysis by Adaptive LUT Activation Function Neurons", Journal of Neural Networks, Jan. 2002, pp. 85-94, vol. 15, No. 1, Elsevier Science Ltd., United Kingdom.

Morrison, A. et al., "Advancing the Boundaries of High-Connectivity Network Simulation with Distributed Computing", Journal of Neural Computation, Aug. 2005, pp. 1776-1801, vol. 17, No. 8, MIT Press, USA.

Rochel, O. et al., "An Event-Driven Framework for the Simulation of Networks of Spiking Neurons", Proceedings of the 11th European Symposium on Artificial Neural Networks (ESANN '03), Apr. 23-25, 2003, pp. 295-300, Catholic University of Louvain, Belgium.

Alcazar, J.G., "EDLUT: Brief description", edlut: Computer application for simulating networks of spiking neurons, Feb. 4, 2010, pp. 1-3, Google, Inc., USA.

Kyung, M. et al., "A VLSI Implementation: Izhikevich's Neuron Model", BENG/BGGN 260 Neurodynamics Course: Winter 2009 Project, pp. 1-30, University of California, San Diego, USA.

Reutimann, J. et al., "Event-Driven Simulation of Spiking Neurons with Stochastic Dynamics", Journal of Neural Computation, Apr. 2003, pp. 811-830, vol. 15, No. 4, MIT Press, USA.

Izhikevich, E.M., "Dynamical Systems in Neuroscience: The Geometry of Excitability and Bursting", Jan. 22, 2010, pp. i-505, MIT Press, USA.

Ros, E. et al., "Event-Driven Simulation Scheme for Spiking Neural Networks Using Lookup Tables to Characterize Neuronal Dynamics", Journal of Neural Computation, Dec. 2006, pp. 2959-2993, vol. 18, No. 12, MIT Press, USA.

Carrillo, R.R. et al., "Lookup Table Powered Neural Event-Driven Simulator", Computational Intelligence and Bioinspired Systems, Proceedings of the Eighth International Work Conference on Artificial Neural Networks (IWANN '05), 2005, pp. 168-175, Springer-Verlag Berlin, Heidelberg, Germany.

Merolla, P. et al., "A Digital Neurosynaptic Core Using Embedded Crossbar Memory with 45pJ per Spike in 45nm", In the Proceedings of the 2011 Custom Integrated Circuits Conference (CICC), Sep. 19-21, 2011, pp. 1-4, IEEE Xplore, United States.

Merolla, P.A. et al., "Expandable Networks for Neuromorphic Chips," IEEE Transactions on Circuits and Systems—I: Regular Papers, Feb. 2007, pp. 301-311, vol. 54, No. 2, IEEE, United States.

Jin, X., "Parallel Simulation of Neural Networks on Spinnaker Universal Neuromorphic Hardware", Doctoral Thesis, 2010, pp. 1-193, University of Manchester, United Kingdom.

U.S. Non-Final Office Action for U.S. Appl. No. 13/725,452 dated Aug. 27, 2014.

U.S. Notice of Allowance for U.S. Appl. No. 13/725,452 dated Mar. 11, 2015.

U.S. Non-Final Office Action for U.S. Appl. No. 13/725,442 dated Oct. 16, 2014.

U.S. Notice of Allowance for U.S. Appl. No. 13/725,442 dated Jan. 30, 2015.

U.S. Non-Final Office Action for U.S. Appl. No. 14/716,718 dated Nov. 19, 2015.

U.S. Final Office Action for U.S. Appl. No. 14/716,718 dated Mar. 28, 2016.

U.S. Non-Final Office Action for U.S. Appl. No. 14/690,326 dated Apr. 17, 2015.

U.S. Notice of Allowance for U.S. Appl. No. 14/690,326 dated Apr. 21, 2016.

U.S. Non-Final Office Action for U.S. Appl. No. 14/690,326 dated Dec. 3, 2015.

U.S. Notice of Allowance for U.S. Appl. No. 14/716,718 dated Jun. 2, 2016.

(56) References Cited

OTHER PUBLICATIONS

U.S. Non-Final Office Action for U.S. Appl. No. 15/239,642 dated Jun. 13, 2018.
U.S. Final Office Action for U.S. Appl No. 15/239,642 dated Aug. 3, 2018.

* cited by examiner

130

| Current State | Next State |
|---|---|
| s (V,h) | $s_{(t+1)}(V_{(t+1)}, h_{(t+1)})$ |
| 0 (0,0) | 64 (0,2) |
| 1 (1,0) | 33 (1,1) |
| 2 (2,0) | 34 (2,1) — $S_{next}$ |
| ⋮ | ⋮ |
| 1021 (29,31) | 991 (31,30) — 131 |
| 1022 (30,31) | 991 (31,30) |
| 1023 (31,31) | 991 (31,30) |

131

230

| Current State | Next State | |
|---|---|---|
| s (V, h) | ΔV (V, h) | Δh (V, h) |
| 0 (0,0) | 0 | 2 |
| 1 (1,0) | 0 | 1 |
| 2 (2,0) | 0 | 1 |
| ⋮ | | |

231

MAPPING NEURAL DYNAMICS OF A NEURAL MODEL ON TO A COARSELY GRAINED LOOK-UP TABLE

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation and in particular, mapping neural dynamics of a neural model on to a lookup table.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

SUMMARY

Embodiments of the invention relate to mapping neural dynamics of a neural model on to a lookup table. One embodiment comprises defining a phase plane for a neural model. The phase plane represents neural dynamics of the neural model. The phase plane is coarsely sampled to obtain state transition information for multiple neuronal states. The state transition information is mapped on to a lookup table.

Another embodiment comprises defining how a system state of a system changes over time, wherein a system state changes based on a current system state of the system. A set of system states for at least one element of the system is coarsely sampled to obtain information about how the system state of the system changes over time for each element of said set. The information obtained is maintained in a lookup table. The lookup table is configured to provide information about a next system state of the system based on a current system state of the system.

Another embodiment comprises a computer program product for mapping neural dynamics of a neural model. The computer program product comprises a computer-readable storage medium having program code embodied therewith. The program code is executable by a computer to define a phase plane for a neural model, coarsely sample the phase plane to obtain state transition information for multiple neuronal states, and map the state transition information on to a lookup table. The phase plane represents neural dynamics of the neural model.

Another embodiment comprises a computer program product for maintaining information about system state changes in a lookup table. The computer program product comprises a computer-readable storage medium having program code embodied therewith. The program code is executable by a computer to define how a system state of a system changes over time, wherein a system state changes based on a current system state of the system. A set of system states for at least one element of the system is coarsely sampled to obtain information about how the system state of the system changes over time for each element of said set. The information obtained is maintained in a lookup table, wherein the lookup table is configured to provide information about a next system state of the system based on a current system state of the system.

These and other features, aspects, and advantages of the present invention will become understood with reference to the following description, appended claims, and accompanying figures.

DETAILED DESCRIPTION

Figures 1, 2A:
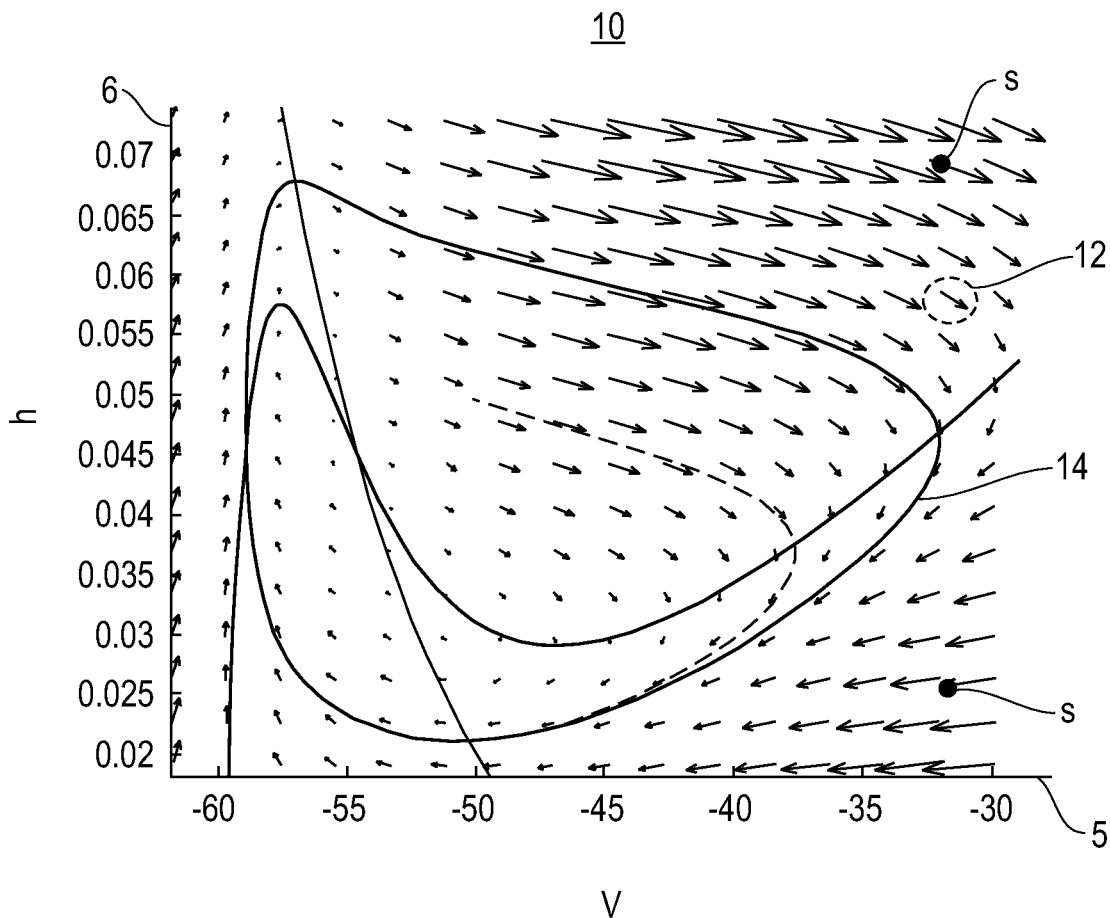
FIG. 1 illustrates an example neural model, in accordance with an embodiment of the invention.
FIG. 2A illustrates an example phase plane for the neural model in FIG. 1, in accordance with an embodiment of the invention.

Embodiments of the invention relate to mapping neural dynamics of a neural model on to a lookup table. One embodiment comprises defining a phase plane for a neural model. The phase plane represents neural dynamics of the neural model. The phase plane is coarsely sampled to obtain state transition information for multiple neuronal states. The state transition information is mapped on to a lookup table.

Another embodiment comprises a computer program product for mapping neural dynamics of a neural model. The computer program product comprises a computer-readable storage medium having program code embodied therewith. The program code is executable by a computer to define a phase plane for a neural model, coarsely sample the phase plane to obtain state transition information for multiple neuronal states, and map the state transition information on to a lookup table. The phase plane represents neural dynamics of the neural model.

Coarsely sampling the phase plane to obtain state transition information for multiple neuronal states comprises computing a trajectory for the neural model. The computed trajectory is mapped on to the lookup table. In one embodiment, noise is added to the computed trajectory.

The lookup table is addressed by a neuronal state. In one embodiment, the state transition information for each neuronal state identifies a subsequent neuronal state that said neuronal state transitions to in response to changes in at least one variable of the neural model. In another embodiment, the state transition information for each neuronal state comprises at least one high-resolution delta value corresponding to a variable of the neural model.

In one embodiment, addressing the lookup table by a neuronal state comprises addressing the lookup table using the most significant bits of a neuronal state.

The neural dynamics of the neural model are defined using at least one variable. In one embodiment, addressing the lookup table by a neuronal state comprises addressing the lookup table using two or more variables of the neural model In one embodiment, spiking information for multiple neuronal states is maintained in the lookup table.

One embodiment comprises defining how a system state of a system changes over time, wherein a system state changes based on a current system state of the system. A set of system states for at least one element of the system is coarsely sampled to obtain information about how the system state of the system changes over time for each element of said set. The information obtained is maintained in a lookup table. The lookup table is configured to provide information about a next system state of the system based on a current system state of the system.

Another embodiment comprises a computer program product for maintaining information about system state changes in a lookup table. The computer program product comprises a computer-readable storage medium having program code embodied therewith. The program code is executable by a computer to define how a system state of a system changes over time, wherein a system state changes based on a current system state of the system. A set of system states for at least one element of the system is coarsely sampled to obtain information about how the system state of the system changes over time for each element of said set. The information obtained is maintained in a lookup table, wherein the lookup table is configured to provide information about a next system state of the system based on a current system state of the system.

In one embodiment, for each system state sampled, each dimension of the system state is represented as a binary number, wherein all dimensions of the system state are concatenated as an n-bit digital number that identifies the system state, and wherein n is a natural number. The change of the system state to a next system state is represented as an m-bit digital number, wherein m is a natural number. The n-bit digital number and the m-bit digital number are stored in the lookup table, wherein a subset of the n-bit digital number is used to address the m-bit digital number in the lookup table.

In another embodiment, for each system state sampled, each dimension of the system state is represented as a binary number, wherein all dimensions of said system state are concatenated as an n-bit digital number identifying said system state, and wherein n is a natural number. A next system state for the system state is represented as an m-bit digital number, wherein m is a natural number. The n-bit digital number and the m-bit digital number are stored in the lookup table, wherein a subset of the n-bit digital number is used to address the m-bit digital number in the lookup table.

In one embodiment, if the system transitions from a first system state to a second system state over a first number of steps, a new system that transitions from the first system state to the second system state is defined over a number of steps that is more than the first number of steps.

In another embodiment, if the system transitions from a first system state to a second system state over a first number of steps, a new system that transitions from the first system state to the second system state is defined over a number of steps that is less than the first number of steps.

In one embodiment, the system is a neural system. For each system state sampled, additional information about whether the system is spiking at the system state is stored in the lookup table.

In one embodiment, for each system state sampled, additional metadata information about the system state is stored in the lookup table.

The term digital neuron as used herein represents a framework configured to simulate or emulate a biological neuron. A digital neuron creates connections between processing elements that are roughly functionally equivalent to neurons of a biological brain. As such, a neuromorphic and synaptronic computation comprising digital neurons, according to embodiments of the invention, may include various electronic circuits that are modeled on biological neurons. Further, a neuromorphic and synaptronic computation comprising digital neurons, according to embodiments of the invention, may include various processing elements (including computer simulations) that are modeled on biological neurons. Although certain illustrative embodiments of the invention are described herein using digital neurons comprising digital circuits, the present invention is not limited to digital circuits. A neuromorphic and synaptronic computation, according to embodiments of the invention, can be implemented as a neuromorphic and synaptronic framework comprising circuitry and additionally as a computer simulation. Indeed, embodiments of the invention can take the form of an entirely hardware embodiment, an entirely software embodiment, or an embodiment containing both hardware and software elements.

FIG. 1 illustrates an example neural model 1, in accordance with an embodiment of the invention. A digital neuron may be modeled on a neural model (i.e., neuron model) 1 that mathematically describes properties associated with biological neurons. Neural dynamics (i.e., neuronal dynamics) representing neuronal activity (e.g., a neuron spiking, an ion-channel's activation or inactivation) may be computed using a neural model 1. There are several different types of neural models 1, such as an integrate and fire neural model, a resonate and fire neural model, an Izhikevich neural model, etc. Neural dynamics may be expressed using one or more variables (elements). In this specification, the progression of a neural model 1 over time is referred to as temporal neural dynamics.

In one embodiment, a 2-variable neural model 1 with a first variable V and a second variable h may be expressed using the following equations: (1) $dV/dt=f(V, h)$, wherein $dV/dt$ represents the rate of change of the first variable V over time; (2) $dh/dt=g(V, h)$, wherein $dh/dt$ represents the rate of change of the second variable h over time; (3) $V=V+dV*dt$; and (4) $h=h+dh*dt$. $f(V, h)$ and $g(V, h)$ may be any function that represents a type of neural model 1. The first variable V and the second variable h represent a neuronal state S of a neuron. In one embodiment, the first variable V represents a membrane potential variable, and the second variable h represents an internal state variable (e.g., an ion-channel's activation or inactivation).

FIG. 2A illustrates an example phase plane 10 for the neural model 1 in FIG. 1, in accordance with an embodiment of the invention. A phase plane 10 represents a state space of a neural model 1 (FIG. 1) and how a neuron's state evolves over time. A phase plane 10 is computed by sampling the equations representing the neural model 1.

As shown in FIG. 2A, a horizontal axis 5 and a vertical axis 6 of the phase plane 10 are denoted as V and h, respectively. The phase plane 10 includes at least one arrow 12. Each arrow 12 represents a state transition from a neuronal state S to another neuronal state S. Each arrow 12 is generated by evaluating $f(V, h)$ and $g(V, h)$ at a coordinate of the phase plane 10.

FIG. 2A also shows a computed desired trajectory 14 of the neural model 1. In this specification, let the term "desired trajectory" denote a path representing progression of a neural model over time. Table 1 below provides example pseudo code that may be used to calculate the desired trajectory 14.

TABLE 1

```
// Seed initial state
V = V__initial;
```

TABLE 1-continued

```
h = h__initial;
// Execute the following code in a loop
V__next = V + f(V,h)*dt;
h__next = h + g(V,h)*dt;
V = V__next;
h = h__next;
```

Figure 2B:
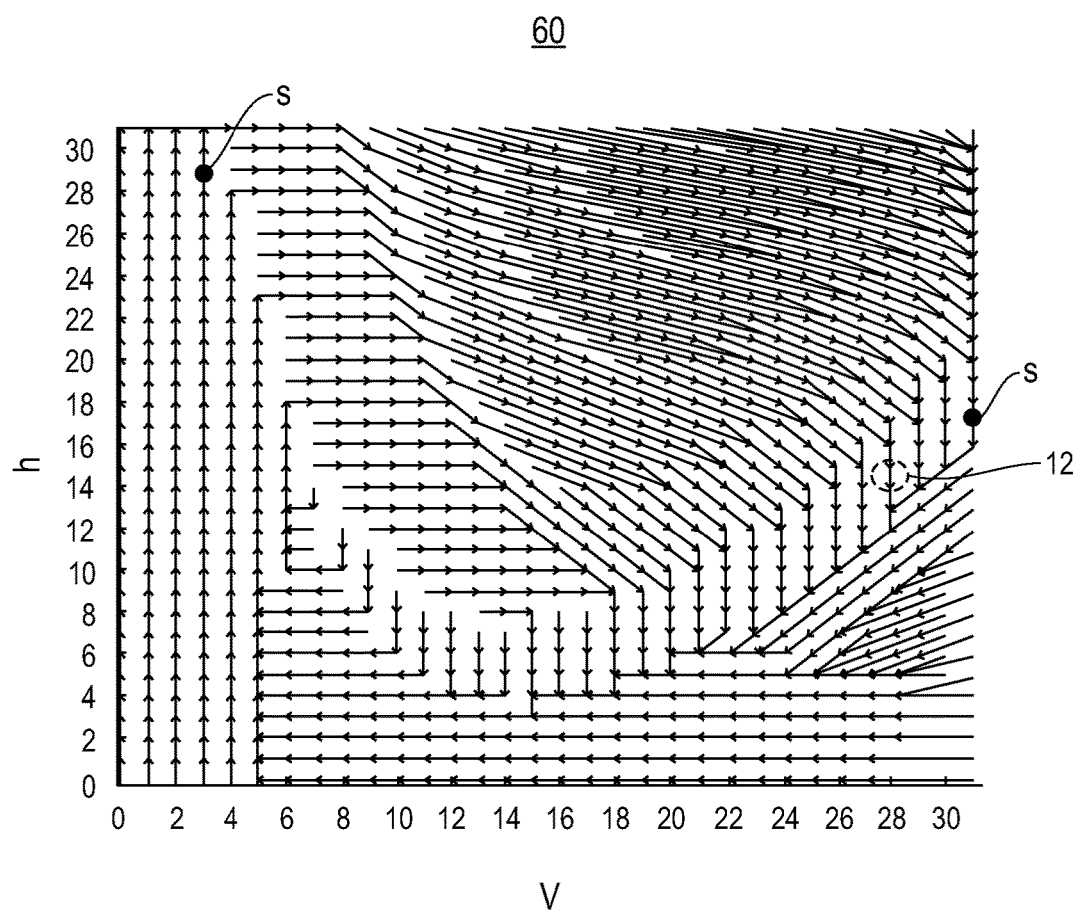
FIG. 2B illustrates an example discretized phase plane of the phase plane in FIG. 2A, in accordance with an embodiment of the invention.

FIG. 2B illustrates an example discretized phase plane 60 of the phase plane 10 in FIG. 2A, wherein each state transition 12 is scaled to point to another sampling point, in accordance with an embodiment of the invention. In this specification, let the terms "discretizing" and "discretized" denote a process of dividing a phase plane into finite elements (e.g., a finite number or neuronal states). The neural dynamics of a neural model 1 may be mapped on to a lookup table 90 (FIG. 7) by sampling a phase plane 10 representing the state space of the neural model 1. Sampling the phase plane 10 comprises obtaining a finite number of neuronal states S.

In one embodiment, the phase plane 10 is discretized into a finite number of neuronal states S. For example, the phase plane 10 may be discretized to generate a discretized phase plane 60. Each arrow 12 in FIG. 2B represents a state transition from one neuronal state S (e.g., a neuronal state $S_{current}$ at the current time step t) to another state s (e.g., a next neuronal state $S_{next}$ at the next time step t+1). The discretized phase plane 60 is sampled to map information relating to state transitions on to a lookup table 90.

There are multiple ways of sampling a phase plane 10. In one embodiment, the equations representing a neural model 1 (e.g., $f(V, h)$ and $g(V, h)$) are evaluated at different sampling points of the discretized phase plane 60, wherein each sampling point represents an neuronal state S. Each result is rounded to the nearest sampling point of the discretized phase plane 60.

In one embodiment, if the system transitions from a first system state to a second system state over a first number of steps, a new system is defined that transitions from the first system state to the second system state over a number of steps that is more than the first number of steps. In another embodiment, if the system transitions from a first system state to a second system state over a first number of steps, a new system is defined that transitions from the first system state to the second system state over a number of steps that is less than the first number of steps.

Figure 3:
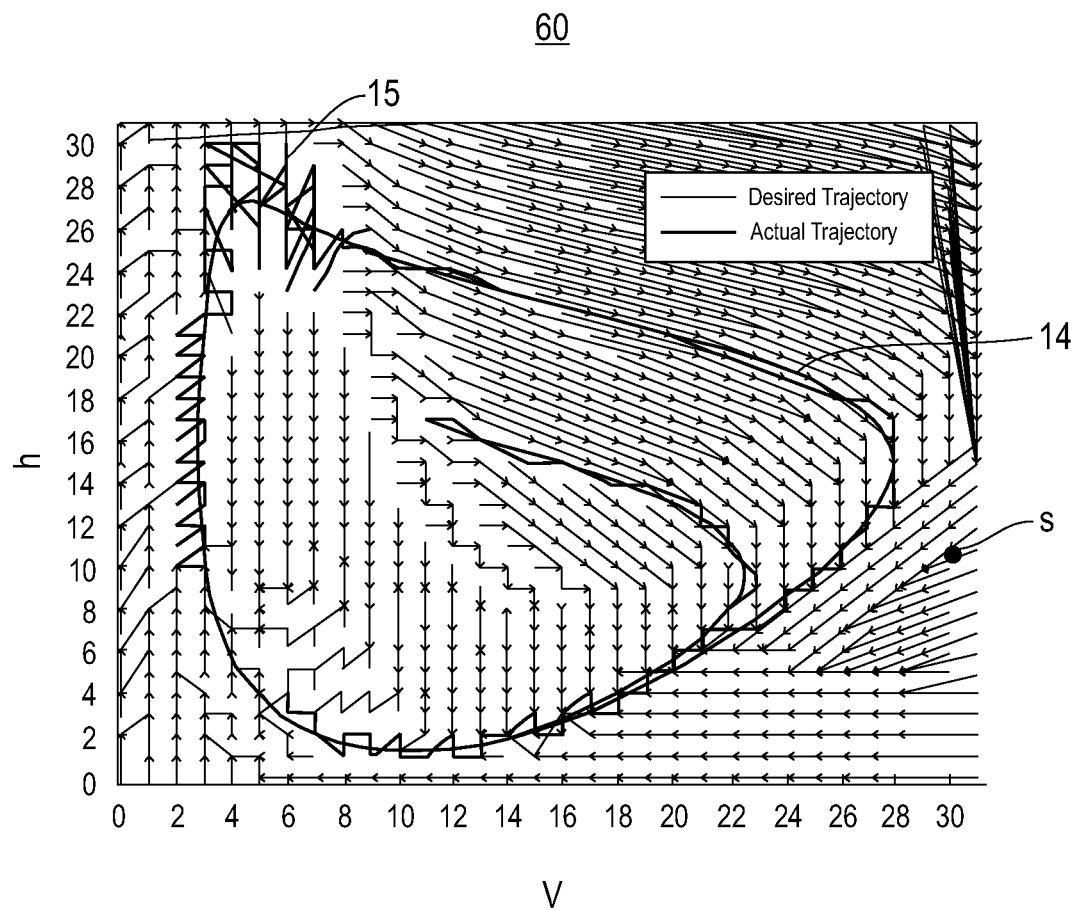
FIG. 3 illustrates an example discretized phase plane for a neural model, wherein the discretized phase plane includes a desired trajectory computed based on the neural model and a resulting actual trajectory computed based on the discretized phase plane, in accordance with an embodiment of the invention.

FIG. 3 illustrates an example discretized phase plane 60 for a neural model 1, wherein the discretized phase plane 60 includes a desired trajectory 14 computed based on the neural model and a resulting actual trajectory computed based on the discretized phase plane, in accordance with an embodiment of the invention. In one embodiment, a desired trajectory 14 representing the progression of a neural model 1 over time is computed using the equations representing the neural model 1 (e.g., $f(V, h)$ and $g(V, h)$). Sampling points representing different neuronal states S are discretized along, or within the proximity of, the computed desired trajectory 14 to generate an actual trajectory 15. Noise may be added to areas of the discretized phase plane 60 where neural dynamics are slower. Adding noise prevents the actual trajectory 15 from entering a dead zone.

As shown in FIG. 3, despite the added noise, the actual trajectory 15 is still as close as possible to the computed desired trajectory 14.

In one embodiment, mapping a two-state neural model 1 to a lookup table comprises selecting maximum and minimum values for V and h ($V_{max}$, $V_{min}$, $h_{max}$, and $h_{min}$). The maximum and minimum values for V and h are divided by the lookup table's number of states for V and h to determine the size of the discretized steps. For example, $V_{step}=(V_{max}-V_{min})/2^{\wedge}V_{bits}$, and $h_{step}=(h_{max}-h_{min})/2^{\wedge}h_{bits}$), wherein $V_{bits}$ and $h_{bits}$ represent the number of bits to store V and h, respectively.

A computed trajectory is then mapped. For example, a transient simulation is computed (e.g., using Euler's method) to determine a trajectory within the discretized phase plane 60. For each timestep of the transient simulation, a neuronal state is rounded to the closest sampling point within the discretized phase plane 60. For example, $p(t)=\text{round}((V(t)-V_{min})/V_{step})$; $q(t)=\text{round}((h(t)-h_{min})/h_{step})$.

Dead zones (i.e., zones where a neuronal state S along the computed trajectory points to itself) within the discretized phase plane 60 are avoided by checking for duplicated neuronal states in adjacent timesteps. The dead zones are eliminated by offsetting duplicated neuronal states to nearby neuronal states. For example, for each duplicated neuronal state, potential alternate neuronal states are created around a sampling point in the discretized phase plane 60. Alternate neuronal states that are already occupied within some ±Δt of the current timestep t are discarded. The duplicated neuronal states are replaced with alternate neuronal states that are vacant and closest in distance to the original neuronal state within the discretized phase plane 60. The trajectory is then mapped to a lookup table. Similarly, the entire discretized phase plane 60 is mapped by computing a trajectory from every sampled neuronal state within the discretized phase plane 60. All neuronal states are constrained within the discretized phase plane 60.

Figure 4:
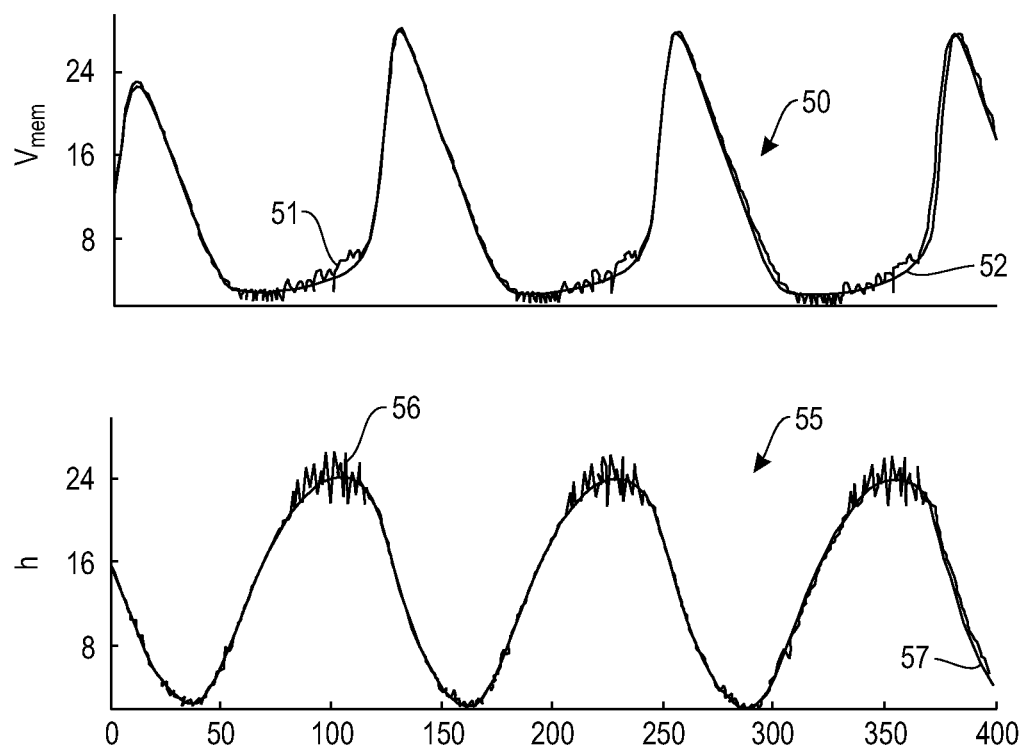
FIG. 4 illustrates waveforms for the example discretized phase plane in FIG. 3, in accordance with an embodiment of the invention.

FIG. 4 illustrates waveforms for the example discretized phase plane 60 in FIG. 3, in accordance with an embodiment of the invention. A first graph 50 represents the first variable V with respect to time. The first graph 50 shows a first waveform 51 and a second waveform 52 corresponding to the actual trajectory 15 and the desired trajectory 14 in FIG. 3, respectively. As shown in FIG. 4, the first waveform 51 substantially matches the second waveform 52.

Also shown in FIG. 4 is a second graph 55 that represents the second variable h with respect to time. The second graph 55 shows a third waveform 56 and a fourth waveform 57 corresponding to the actual trajectory 15 and the desired trajectory 14 in FIG. 3, respectively. As shown in FIG. 4, the third waveform 56 substantially matches the fourth waveform 57.

In one embodiment, for each system state sampled, each dimension of the system state is represented as a binary number, wherein all dimensions of the system state are concatenated as an n-bit digital number that identifies the system state, and wherein n is a natural number. The change of the system state to a next system state is represented as an m-bit digital number, wherein m is a natural number. The n-bit digital number and the m-bit digital number are stored in the lookup table, wherein a subset of the n-bit digital number is used to address the m-bit digital number in the lookup table.

In another embodiment, for each system state sampled, each dimension of the system state is represented as a binary number, wherein all dimensions of said system state are concatenated as an n-bit digital number identifying said system state, and wherein n is a natural number. A next system state for the system state is represented as an m-bit digital number, wherein m is a natural number. The n-bit digital number and the m-bit digital number are stored in the lookup table, wherein a subset of the n-bit digital number is used to address the m-bit digital number in the lookup table.

Figure 5:
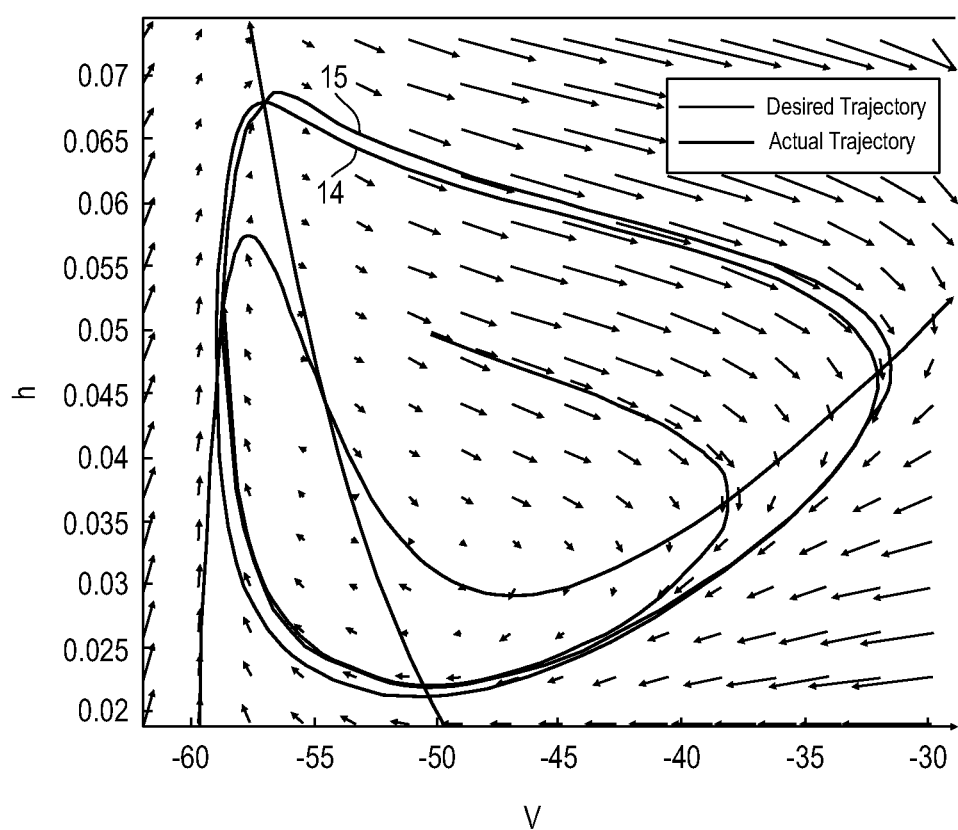
FIG. 5 illustrates an example coarsely discretized phase plane for a neural model, in accordance with an embodiment of the invention.
Figure 12:
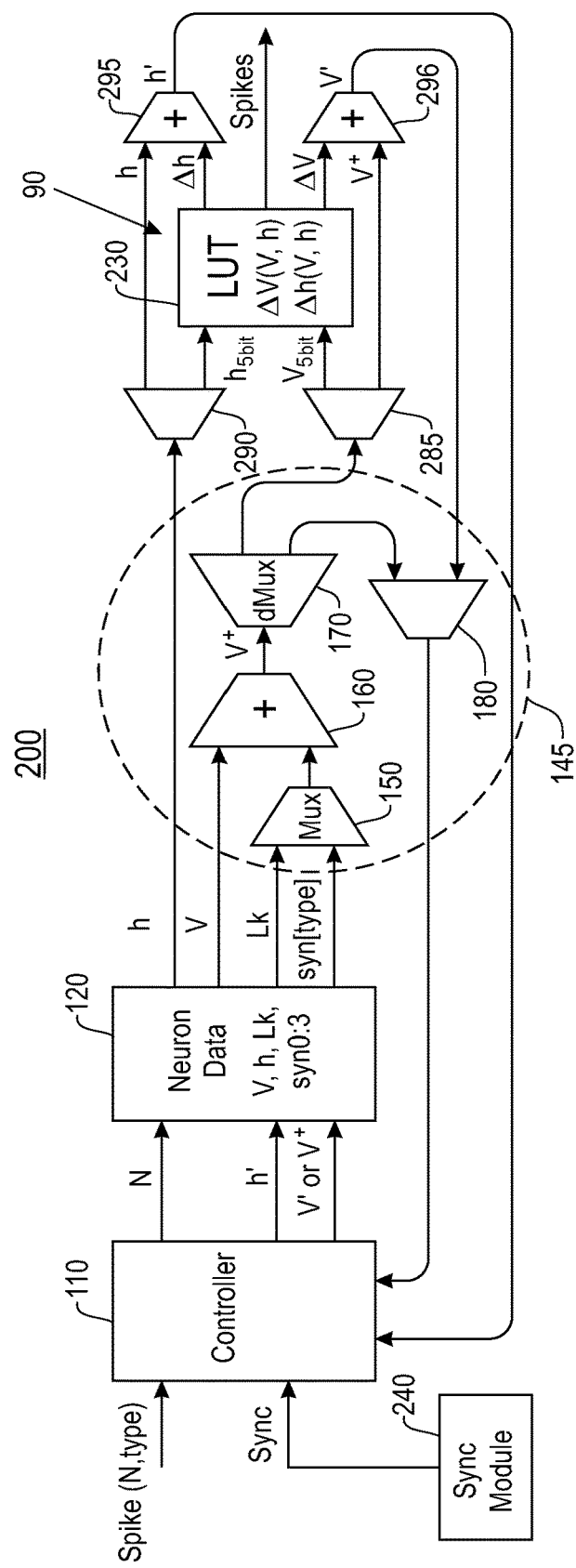
FIG. 12 illustrates an example neural network system for simulating neurons of a neural model, wherein the system includes a delta-based lookup table that maintains high-resolution delta values of at least one variable of the neural model, in accordance with an embodiment of the invention.

FIG. 5 illustrates an example coarsely discretized phase plane 60 for a neural model 1, in accordance with an embodiment of the invention. In one embodiment, the phase plane 10 (FIG. 2) is coarsely discretized. In this specification, let the term "delta value" denote a difference or change between two values. To precisely capture the neural model 1's slowest and fastest neural dynamics, high-resolution delta values for variables of the neural model 1, such as V and h, are maintained in a delta-based lookup table 230 (FIG. 12). Maintaining high-resolution delta values generates the actual trajectory 15, wherein the actual trajectory 15 is smooth and qualitatively similar to a computed desired trajectory 14.

In one embodiment, mapping a two-state neural model 1 to a delta-based lookup table comprises selecting maximum and minimum values for V and h ($V_{max}$, $V_{min}$, $h_{max}$, and $h_{min}$). The maximum and minimum values for V and h are divided by the delta-based lookup table's number of states for V and h to determine the size of the discretized steps. For example, $V_{step}=(V_{max}-V_{min})/2^{\wedge}V_{bits}$, and $h_{step}=(h_{max}-h_{min})/2^{\wedge}h_{bits}$), wherein $V_{bits}$ and $h_{bits}$ represent the number of bits to store V and h, respectively.

$dV=f(V,h)*dt$ and $dh=g(V,h)*dt$ are computed for each sample point within the discretized phase plane 60. dV and dh are rounded up and discretized into binary ΔV and Δh that will populate the delta-based lookup table. Stable equilibrium points are found, and dV and dh are updated for all equilibrium points. The dV and dh values are constrained such that a neuronal state is constrained within the discretized phase plane 60. All binary ΔV and Δh values are then mapped to a delta-based lookup table.

Figure 6:
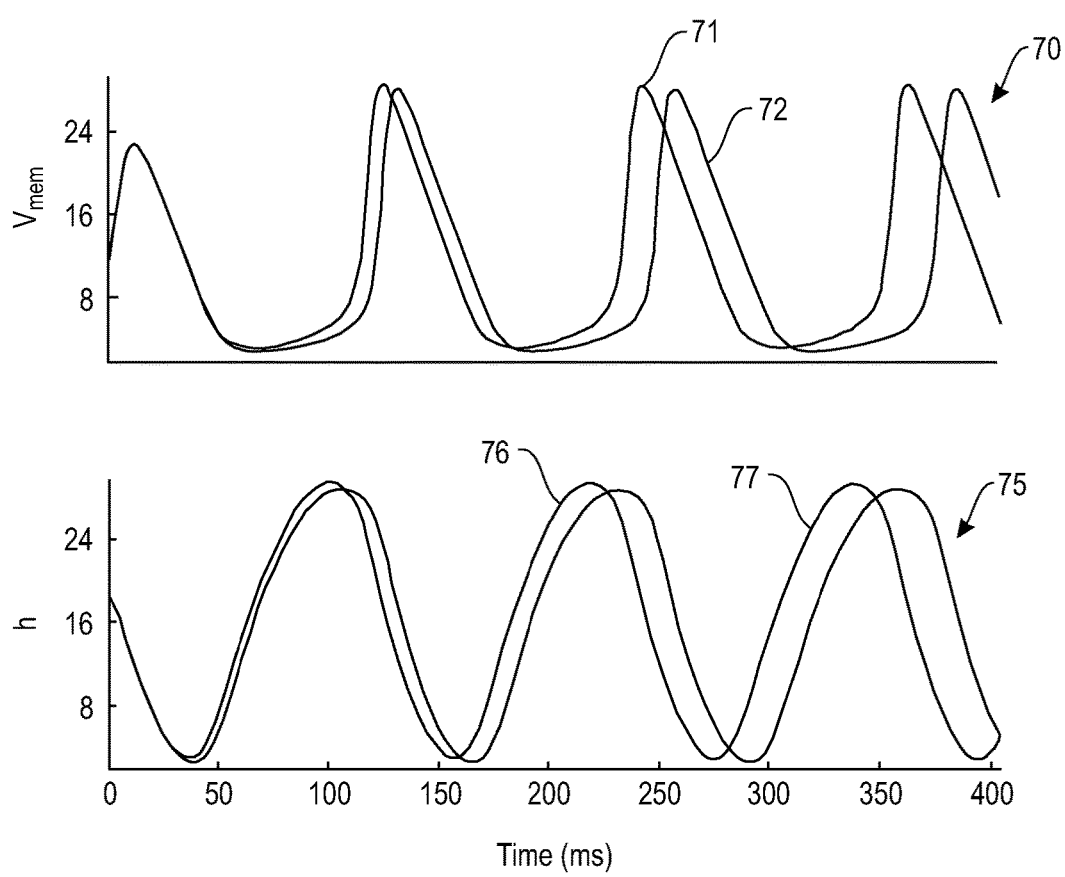
FIG. 6 illustrates graphs for the example discretized phase plane in FIG. 5, in accordance with an embodiment of the invention.

FIG. 6 illustrates waveforms for the example discretized phase plane 60 in FIG. 5, in accordance with an embodiment of the invention. A first graph 70 represents the first variable V with respect to time. The first graph 70 shows a first waveform 71 and a second waveform 72 corresponding to the actual trajectory 15 and the desired trajectory 14 in FIG. 5, respectively. As shown in FIG. 6, the first waveform 71 is smooth and qualitatively similar to the second waveform 72. The difference in periods between the first waveform 71 and the second waveform 72 is attributable to discretization error.

Also shown in FIG. 6 is a second graph 75 that represents the second variable h with respect to time. The second graph 75 shows a third waveform 76 and a fourth waveform 77 corresponding to the actual trajectory 15 and the desired trajectory 14 in FIG. 5, respectively. As shown in FIG. 6, the third waveform 76 is smooth and qualitatively similar to the fourth waveform 77. The difference in periods between the third waveform 76 and the fourth waveform 77 is attributable to discretization error.

Figure 7:
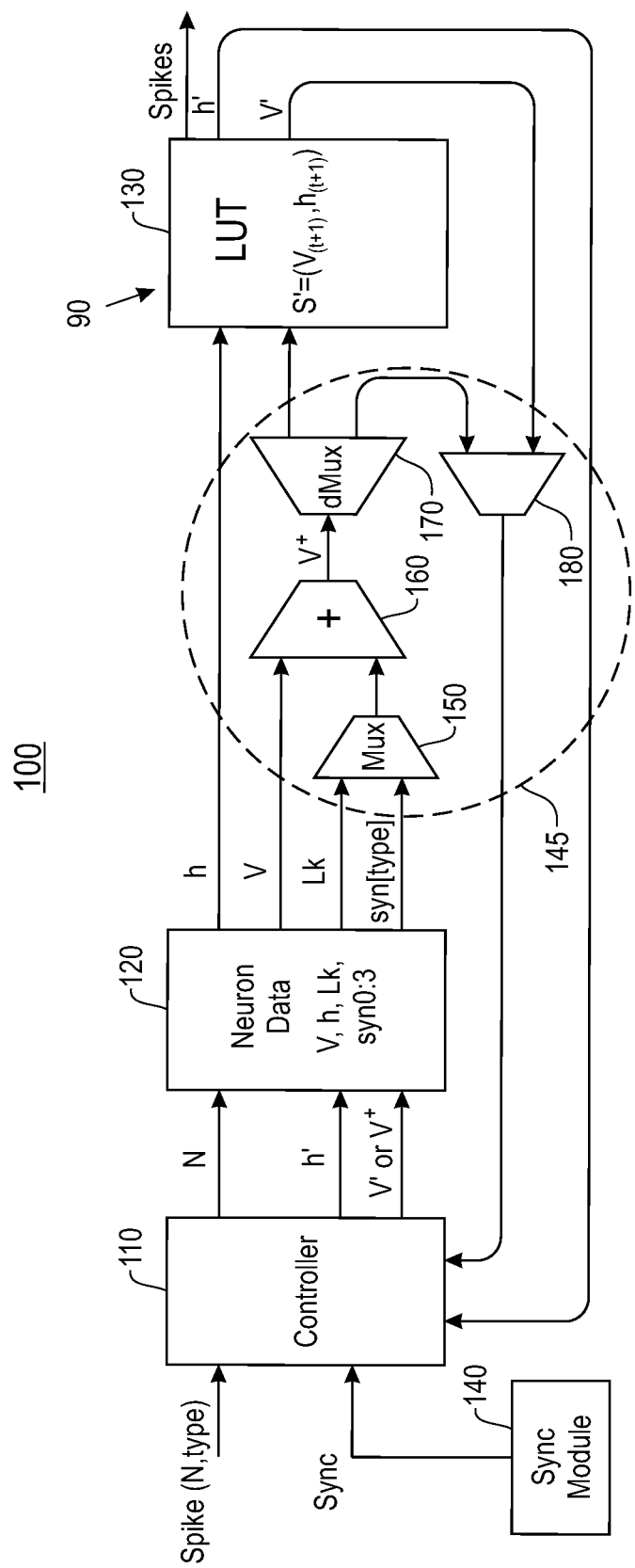
FIG. 7 illustrates an example neural network system for simulating neurons of a neural model, wherein the system includes a lookup table that maintains a sequence of neuronal states, in accordance with an embodiment of the invention.

FIG. 7 illustrates an example neural network system 100 for simulating neurons of a neural model 1, wherein the system 100 includes a lookup table 130 that maintains a sequence of neuronal states S, in accordance with an embodiment of the invention. The system 100 comprises a controller unit 110, a memory device 120, a lookup table 130, a computation fabric 145, and a sync module 140.

The memory device 120 is a memory array that maintains neuronal state information for multiple neurons of the same neural model 1 (i.e., neurons of the same type). The neuronal state information for a neuron includes the current neuronal state $S_{current}$ of the neuron (i.e., the neuronal state of the neuron at the current time step). A neuronal state S of a neuron may be expressed using one or more variables of the neural model 1, such as a membrane potential variable V and an internal state variable h. The neuronal state information for a neuron may further include neuron parameters and additional metadata about the system, such as a leak rate Lk and synaptic weights for different types of synaptic connections (e.g., Syn0, Syn1, Syn2, Syn3).

The controller unit 110 manages all synaptic inputs received. In one embodiment, the controller unit 110 receives incoming spike events targeting neurons of the system 100. Each incoming spike event is tagged with information identifying a target neuron for said spike event, and a type of synaptic connection that said spike event was received from.

The computation fabric 145 integrates each incoming spike event received.

The sync module 140 generates synchronization signals for the controller unit 110. The controller unit 110 sequentially updates the current neuronal state $S_{current}$ of each neuron of the system 100 when the controller unit 110 receives a synchronization signal.

The lookup table 130 maintains state transition information for a finite number of neuronal states S. Specifically, the lookup table 130 maintains a sequence of neuronal states S. The state transition information for each neuronal state S identifies a next neuronal state $S_{next}$ (i.e., a subsequent neuronal state) that said state s transitions to. A neuronal state S is used to address (i.e., index) the lookup table 130. In this specification, let the term "most significant bits" denote high-order bits, i.e., bit positions in a binary number having the greatest values. For example, the lookup table 130 is addressed by combining the most significant bits of the membrane potential variable V with the most significant bits of the internal state variable h.

In one embodiment, for each incoming spike event received in a current time step t, the controller unit 110 sends a read request to the memory device 120 for the following neuron parameters: the membrane potential variable V of a target neuron in the current time step t, and the synaptic weight for the type of synaptic connection that said spike event was received from. The computation fabric 145 generates a modified membrane potential variable $V^+$ for the target neuron by adding the synaptic weight to the membrane potential variable V (i.e., integrating the spike event). The controller unit 110 writes the modified membrane potential variable $V^+$ to the memory device 120.

The memory device 120 is read out sequentially when the controller unit 110 receives a synchronization signal. For each neuron of the system 100, the controller unit 110 sends a read request to the memory device 120 for the membrane potential variable V of the neuron, the internal state variable h of the neuron, and the leak rate Lk of the neuron. The computation fabric 145 generates a modified membrane potential variable $V^+$ for the neuron by adding the leak rate Lk to the membrane potential variable V.

The modified membrane potential variable $V^+$ and the internal state variable h provide the current neuronal state $S_{current}$ of the neuron. To obtain state transition information for the current neuronal state $S_{current}$, the lookup table 130 is addressed by combining the most significant bits of the modified membrane potential variable $V^+$ with the most significant bits of the internal state variable h.

The lookup table 130 provides an updated membrane potential variable V' and an updated internal state variable h', wherein the variables V' and h' identify a next neuronal state $S_{next}$ that the current neuronal state $S_{current}$ transitions to. The controller unit 110 writes the updated membrane potential variable V' and the updated internal state variable h' to the memory device 120.

The lookup table 130 also provides an outgoing spike event if the current neuronal state $S_{current}$ generates a spike event. The membrane potential variable V for the neuron may be reset to zero if the current neuronal state $S_{current}$ generates a spike event.

In another embodiment, each incoming spike event received is buffered. For each neuron of the system 100, the controller unit 110 sends a read request to the memory device 120 for neuronal state information corresponding to said neuron. Based on the neuronal state information for said neuron, the computation fabric 145 integrates all incoming spike events targeting said neuron at once to generate a modified membrane potential variable $V^+$ for said neuron. The modified membrane potential variable $V^+$ and the internal state variable h for said neuron are then used to address the lookup table 130 to obtain state transition information for said neuron.

As shown in FIG. 7, the computation circuit 145 comprises a first multiplexer 150, an adder 160, a demultiplexer 170, and a second multiplexer 180. The first multiplexer 150 selects between a leak rate Lk and a synaptic weight for a type of synaptic connection (syn[type]). The first multiplexer 150 selects a synaptic weight for a synaptic connection when the system 100 integrates an incoming spike event. The first multiplexer 150 selects a leak rate Lk when the system 100 updates the current neuronal state $S_{current}$ of a neuron (i.e., after all incoming spike events have been integrated).

The adder 160 applies a synaptic weight for a type of synaptic connection when the system 100 integrates an incoming spike event. The adder 160 applies a leak rate Lk to a membrane potential variable V when the system 100 updates the current neuronal state $S_{current}$ of a neuron.

The demultiplexer 170 provides a modified membrane potential variable $V^+$ computed by the adder 160 to the second multiplexer 180 and the lookup table 130. To obtain state transition information for a current neuronal state $S_{current}$, the lookup table 130 is addressed by combining the most significant bits of the modified membrane potential variable $V^+$ and the most significant bits of the internal state variable h.

The second multiplexer 180 selects between a modified membrane potential variable $V^+$ provided by the demultiplexer 170 and an updated membrane potential variable V' provided by the lookup table 130. The second multiplexer 180 selects a modified membrane potential variable $V^+$ when the system 100 integrates each incoming spike event received. The second multiplexer 180 selects an updated membrane potential variable V' when the system 200 updates the current neuronal state $S_{current}$ of a neuron.

In one example implementation, the memory device 120 maintains neuronal state information for about 256 neurons. The size of the memory device 120 is about 256×60 bits, wherein each neuron has 60 bits of corresponding neuronal state information. In another example implementation, the size of the memory device 120 is about 256×150 bits, wherein each neuron has 150 bits of corresponding neuronal state information.

In one example implementation, the lookup table 130 is addressed by combining the 5 most significant bits of the membrane potential variable V and the 5 most significant bits of the internal state h. The lookup table 130 maintains state transition information for about 1024 neuronal states S of a neural model 1. The size of the lookup table 130 is about 1024×11 bits, wherein each neuronal state S has 11 bits of corresponding state transition information. The corresponding state transition information for each neuronal state S includes 5 bits of an updated membrane potential variable V', 5 bits of an updated internal state variable h', and 1 bit indicating whether an outgoing spike event is generated, wherein V' and h' express a next neuronal state $S_{next}$.

Table 2 below provides example pseudo code, demonstrating the execution of the system 100.

TABLE 2

```
// Step 1: Handle all synaptic inputs
for n=0 to num_synaptic_inputs − 1
    if spike(n) then nLUT[n].state.V += syn[type];
// Step 2: Sync: Update all neurons' state
for n=0 to num_neurons − 1
    nLUT[n].state.V += nLUT[n].Lk;
    nLUT[n].state = dLUT[ nLUT[n].state ];
```

Figure 8:
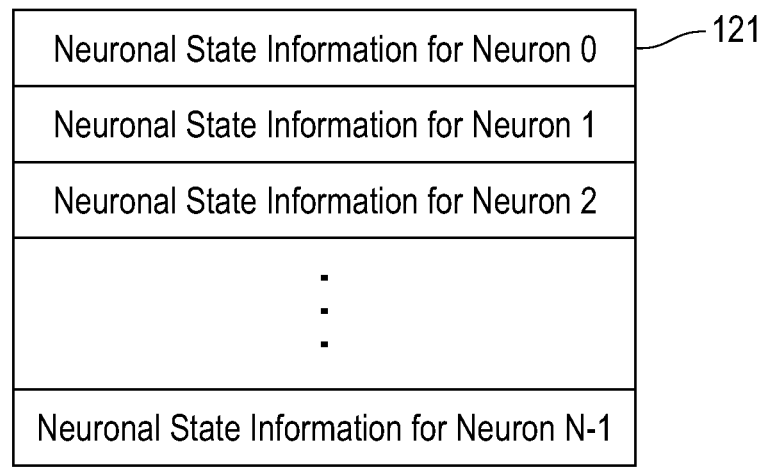
FIG. 8 illustrates example neuronal state information maintained in the memory device in FIG. 7, in accordance with an embodiment of the invention.

FIG. 8 illustrates example neuronal state information maintained in the memory device 120 in FIG. 7, in accordance with an embodiment of the invention. As stated above, the memory device 120 maintains neuronal state information for multiple neurons. The memory device 120 is organized into multiple entries 121. Each entry 121 maintains neuronal state information for a corresponding neuron.

Figure 9:
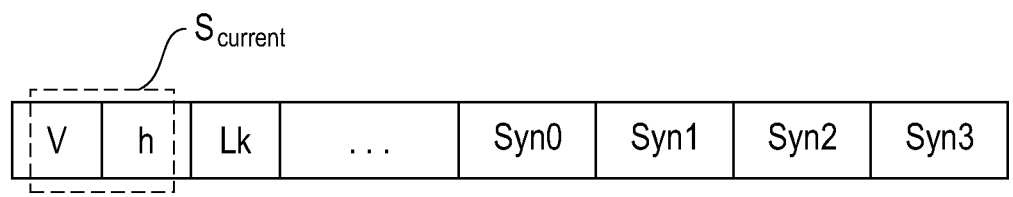
FIG. 9 illustrates example neuronal state information maintained in an entry of the memory device in FIG. 8, in accordance with an embodiment of the invention.

FIG. 9 illustrates example neuronal state information maintained in an entry 121 of the memory device 120 in FIG. 8, in accordance with an embodiment of the invention. In one embodiment, each entry 121 corresponding to a neuron maintains at least one variable of a neural model 1, such as a membrane potential variable V and an internal state variable h. The membrane potential variable V of a neuron and the internal state variable h of the neuron provides the current neuronal state $S_{current}$ of the neuron.

Each entry 121 corresponding to a neuron may further include neuron parameters, such as a leak rate Lk of the neuron, synaptic weights for different types of synaptic connections (e.g., Syn0, Syn1, Syn2, Syn3), and other neuron parameters for complex neural models.

Figures 10, 11:
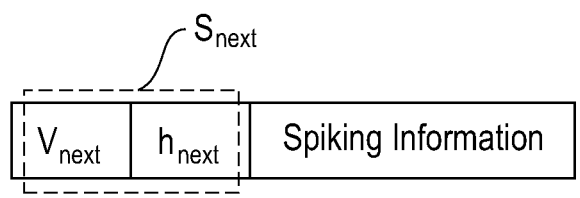
FIG. 10 illustrates example state transition information maintained in the lookup table in FIG. 7, in accordance with an embodiment of the invention.
FIG. 11 illustrates example state transition information maintained in an entry of the lookup table in FIG. 10, in accordance with an embodiment of the invention.

FIG. 10 illustrates example state transition information maintained in the lookup table 130 in FIG. 7, in accordance with an embodiment of the invention. As stated above, the lookup table 130 maintains state transition information for a finite number of neuronal states S. The lookup table 130 is organized into multiple entries 131. Each entry 131 maintains state transition information for a corresponding neuronal state S. The state transition information for each neuronal state S identifies a next neuronal state $S_{next}$ (i.e., subsequent neuronal state) that said state s transitions to.

The lookup table 130 is addressed by a neuronal state S. As stated above, a neuronal state of a neuron may be expressed using a membrane potential variable V and an internal state variable h of the neuron. As such, in one embodiment, the lookup table 130 is addressed by combining the most significant bits of a membrane potential variable V with the most significant bits of an internal state variable h.

FIG. 11 illustrates example state transition information maintained in an entry 131 of the lookup table 130 in FIG. 10, in accordance with an embodiment of the invention. In one embodiment, each entry 131 corresponding to a neuronal state S identifies a next neuronal state $S_{next}$ that said neuronal state S transitions to. As stated above, in one embodiment, a neuronal state S may be expressed using a membrane potential variable V and an internal state variable h. Therefore, each entry 131 maintains a membrane potential variable $V_{next}$ and an internal state variable $h_{next}$, wherein $V_{next}$ and $h_{next}$ express a next neuronal state $S_{next}$.

Each entry 131 may further maintain spiking information indicating whether a corresponding neuronal state S generates an outgoing spike event.

FIG. 12 illustrates an example neural network system 200 for simulating neurons of a neural model 1, wherein the system 200 includes a delta-based lookup table 230 that maintains high-resolution delta values of at least one variable of the neural model 1, in accordance with an embodiment of the invention. The system 200 comprises a controller unit 110, a memory device 120, a delta-based lookup table 230, a computation fabric 145, a sync module 240, a first adder 295, and a second adder 296.

The memory device 120 is a memory array that maintains neuronal state information for multiple neurons of the same neural model 1 (i.e., neurons of the same type). The neuronal state information for a neuron includes the current neuronal state $S_{current}$ of the neuron (i.e., the neuronal state of the neuron at the current time step). A neuronal state S of a neuron may be expressed using one or more variables of the neural model 1, such as a membrane potential variable V and an internal state variable h. The neuronal state information for a neuron may further include neuron parameters, such as a leak rate Lk and synaptic weights for different types of synaptic connections (e.g., Syn0, Syn1, Syn2, Syn3).

The controller unit 110 manages all synaptic inputs received. In one embodiment, the controller unit 110 receives incoming spike events targeting neurons of the system 200. Each incoming spike event is tagged with information identifying a target neuron for said spike event, and a type of synaptic connection that said spike event was received from.

The computation fabric 145 integrates each incoming spike event received.

The sync module 240 generates synchronization signals for the controller unit 110. The controller unit 110 sequentially updates the current neuronal state $S_{current}$ of each neuron of the system 200 when the controller unit 110 receives a synchronization signal.

The delta-based lookup table 230 maintains state transition information for a finite number of neuronal states S. Specifically, the delta-based lookup table 230 maintains high-resolution delta values of one or more variables of the neural model 1. The high-resolution delta values maintained in the delta-based lookup table 230 allows the system 200 to capture both the slowest and the fastest neural dynamics of the neural model 1. As described in detail later herein, the system 200 determines a next neuronal state $S_{next}$ for a current neuronal state $S_{current}$ based on the high-resolution delta values maintained in the delta-based lookup table 230 for the current neuronal state $S_{current}$.

In one embodiment, the delta-based lookup table 230 maintains high-resolution delta values of the membrane potential variable V (i.e., ΔV) and high-resolution delta values of the internal state variable h (i.e., Δh). A neuronal state S is used to address (i.e., index) the delta-based lookup table 230. For example, the delta-based lookup table 230 is addressed by combining the most significant bits of the membrane potential variable V with the most significant bits of the internal state variable h.

For each incoming spike event received in a current time step t, the controller unit 110 sends a read request to the memory device 120 for the following neuron parameters: the membrane potential variable V of a target neuron, and the synaptic weight for type of synaptic connection that said spike event was received from. The computation fabric 145 generates a modified membrane potential variable V⁺ for the target neuron by adding the synaptic weight to the membrane potential variable V (i.e., integrating the spike event). The controller unit 110 writes the modified membrane potential variable V⁺ to the memory device 120.

The memory device 120 is read out sequentially when the controller unit 110 receives a synchronization signal. For each neuron of the system 200, the controller unit 110 sends a read request to the memory device 120 for the membrane potential variable V of the neuron, the internal state variable h of the neuron, and the leak rate Lk of the neuron. The computation fabric 145 generates a modified membrane potential variable V⁺ for the neuron by adding the leak rate Lk to the membrane potential variable V.

The modified membrane potential variable V⁺ and the internal state variable h provide the current neuronal state $S_{current}$ of the neuron. To obtain state transition information for the current neuronal state $S_{current}$, the delta-based lookup table 230 is addressed by combining the most significant bits of the modified membrane potential variable V⁺ with the most significant bits of the internal state variable h.

The state transition information for the current neuronal state $S_{current}$ includes a high-resolution delta membrane potential variable ΔV and a high-resolution delta internal state variable Δh. The system 200 determines a next neuronal state $S_{next}$ for the current neuronal state $S_{current}$ using the delta membrane potential variable ΔV and the delta internal state variable Δh. Specifically, the first adder 295 provides an updated membrane potential variable V' by adding the delta membrane potential variable ΔV to the modified membrane potential variable V⁺. The second adder 296 provides an updated internal state variable h' by adding the delta internal state variable Δh to the internal state variable h.

The updated membrane potential variable V' and the updated internal state variable h' provide the next neuronal state $S_{t+1}$ of the neuron. The controller unit 110 writes the updated membrane potential variable V' and the updated internal state variable h' to the memory device 120.

The lookup table 230 also provides an outgoing spike event if the current neuronal state $S_{current}$ generates a spike event. The membrane potential variable V for the neuron may be reset to zero if the current neuronal state $S_{current}$ generates a spike event.

In another embodiment, each incoming spike event received is buffered. For each neuron of the system 100, the controller unit 110 sends a read request to the memory device 120 for neuronal state information corresponding to said neuron. Based on the neuronal state information for said neuron, the computation fabric 145 integrates all incoming spike events targeting said neuron at once to generate a modified membrane potential variable V⁺ for said neuron. The modified membrane potential variable V⁺ and the internal state variable h for said neuron are then used to address the lookup table 230 to obtain state transition information for said neuron.

As shown in FIG. 12, the computation circuit 145 comprises a first multiplexer 150, a third adder 160, a first demultiplexer 170, and a second multiplexer 180. The first multiplexer 150 selects between a leak rate Lk and a synaptic weight for a type of synaptic connection (syn [type]). The first multiplexer 150 selects a synaptic weight for a type of synaptic connection when the system 200 integrates an incoming spike event. The first multiplexer 150 selects a leak rate Lk when the system 200 updates the current neuronal state $S_{current}$ of a neuron (i.e., after all incoming spike events have been integrated).

The third adder 160 applies a synaptic weight for a type of synaptic connection to a membrane potential variable V when the system 200 integrates an incoming spike event. The third adder 160 applies a leak rate Lk to a membrane potential variable V when the system 200 updates the current neuronal state $S_{current}$ of a neuron.

The first demultiplexer 170 provides a modified membrane potential variable V⁺ computed by the third adder 160 to the second multiplexer 180 and a second demultiplexer 285. The second demultiplexer 285 provides the modified membrane potential variable V⁺ to the second adder 296 and the most significant bits of the modified membrane potential variable V⁺ to the delta-based lookup table 230. A third demultiplexer 290 provides the internal state variable h to the first adder 295 and the most significant bits of the internal state variable h to the delta-based lookup table 230. To obtain state transition information for a current neuronal state $S_{current}$, the delta-based lookup table 230 is addressed by combining the most significant bits of the modified membrane potential variable V⁺ and the most significant bits of the internal state variable h.

The second multiplexer 180 selects between a modified membrane potential variable V⁺ provided by the first demultiplexer 170 and an updated membrane potential variable V' provided by the second adder 296. The second multiplexer 180 selects a modified membrane potential variable V⁺ when the system 200 integrates each incoming spike event. The second multiplexer 180 selects an updated membrane potential variable V' when the system 200 updates the current neuronal state $S_{current}$ of a neuron.

In one example implementation, the memory device 120 maintains neuronal state information for about 256 neurons. The size of the memory device 120 is about 256×60 bits, wherein each neuron has 60 bits of corresponding neuronal state information.

In one example implementation, the delta-based lookup table 230 is addressed by combining the 5 most significant bits of the membrane potential variable V and the 5 most significant bits of the internal state h. The delta-based lookup table 130 maintains state transition information for about 1024 neuronal states of a neural model 1. The size of the lookup table 130 is about 1024×21 bits, wherein each neuronal state has 21 bits of corresponding state transition information. The corresponding state transition information for each neuronal state includes 10 bits of a delta membrane potential variable ΔV, 10 bits of a delta internal state variable Δh, and 1 bit indicating whether an outgoing spike event is generated.

Table 3 below provides example pseudo code, demonstrating the execution of the system 100.

TABLE 3

Figures 13, 14:
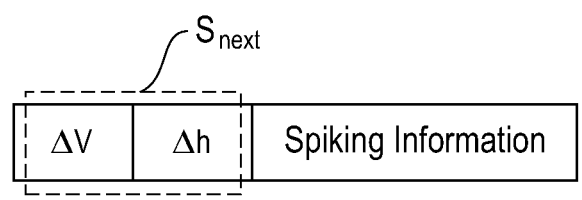
FIG. 13 illustrates example state transition information maintained in the lookup table in FIG. 12, in accordance with an embodiment of the invention.
FIG. 14 illustrates example state transition information maintained in an entry of the lookup table in FIG. 13, in accordance with an embodiment of the invention.

// Step 1: Handle all synaptic inputs
for n=0 to num_synaptic_inputs − 1
   if spike(n) then nLUT[n].state.V += syn[type];
// Step 2:Sync: Update all neuron's states
for n=0 to num_neurons − 1
   state =nLUT[n].state
   nLUT[n].state.V += dLUT[ state ].ΔV + nLUT[n].Lk;
   nLUT[n].state.h += dLUT[ state ].Δh;

FIG. 13 illustrates example state transition information maintained in the lookup table 230 in FIG. 12, in accordance with an embodiment of the invention. As stated above, the lookup table 230 maintains state transition information for a finite number of neuronal states S. The lookup table 230 is organized into multiple entries 231. Each entry 231 maintains state transition information for a corresponding neuronal state S.

The lookup table 230 is addressed by a neuronal state S. As stated above, a neuronal state of a neuron may be expressed using a membrane potential variable V and an internal state variable h of the neuron. As such, in one embodiment, the lookup table 230 is addressed by combining the most significant bits of a membrane potential variable V with the most significant bits of an internal state variable h.

FIG. 14 illustrates example state transition information maintained in an entry 231 of the lookup table 230 in FIG. 13, in accordance with an embodiment of the invention. In one embodiment, each entry 231 corresponding to a neuronal state S provides a high-resolution delta membrane potential variable $\Delta V$ and a high-resolution delta internal state variable $\Delta h$. The system 200 determines a next neuronal state $S_{next}$ for a neuronal state S using the delta membrane potential variable $\Delta V$ and the delta internal state variable $\Delta h$ corresponding to the neuronal state S.

Each entry 231 may further maintain spiking information indicating whether a corresponding neuronal state S generates an outgoing spike event.

In one embodiment, a LUT 130, 230 is multiplexed to service all neurons that the memory device 120 maintains neuronal state information for, such that the same LUT 130, 230 is used to describe the neural dynamics of the neurons. The neurons may be configured to exhibit different neural dynamics by configuring at least one neuron parameter (e.g., the leak rate Lk) corresponding to each neuron.

Figure 15:
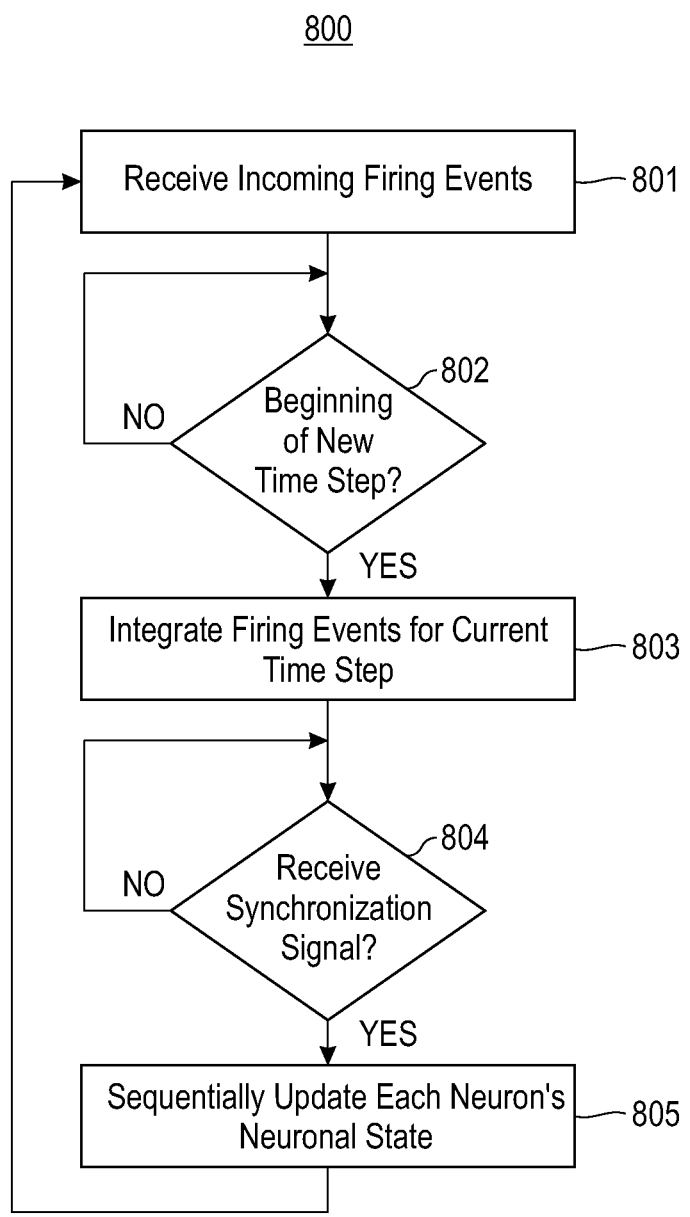
FIG. 15 illustrates a flowchart of an example process for integrating synaptic firing events and updating each neuron's neuronal state, in accordance with an embodiment of the invention.

FIG. 15 illustrates a flowchart of an example process 800 for integrating synaptic firing events and updating each neuron's state, in accordance with an embodiment of the invention. In process block 801, the system receives incoming firing events. In process block 802, the system determines whether a new time step has begun. If a new time step has not begun, return to process block 802. If a new time step has begun, proceed to process block 803 wherein incoming firing events for the current time step are integrated. In process block 804, determine whether a synchronization signal has been received. If a synchronization signal has not been received, return to process block 804. If a synchronization signal has been received, proceed to process block 805 wherein each neuron's neuronal state is sequentially updated. After process block 805, return to process block 801.

Figure 16:
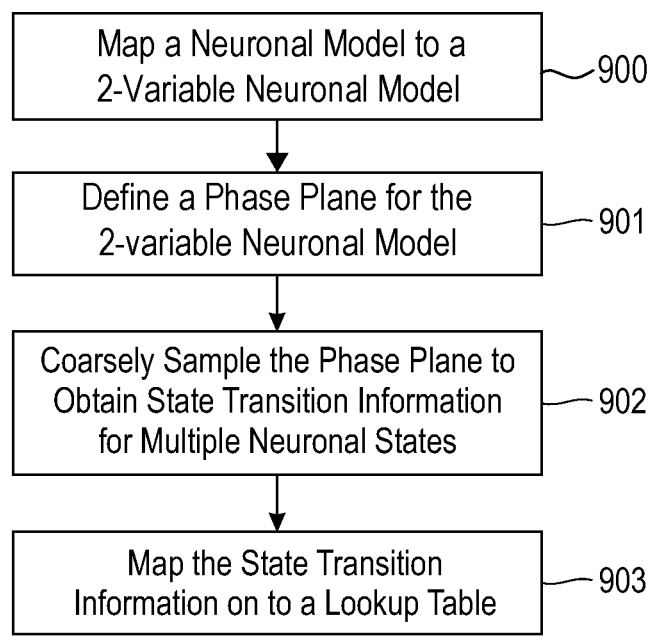
FIG. 16 illustrates a flowchart of an example process for mapping neural dynamics of a neural model on to a lookup table, in accordance with an embodiment of the invention.

FIG. 16 illustrates a flowchart of an example process 899 for mapping neural dynamics of a neural model on to a lookup table, in accordance with an embodiment of the invention. In process block 900, a neuronal model to a two-variable neuronal model is mapped. In process block 901, a phase plane for a neural model is defined. In process block 902, the phase plane to obtain state transition information for multiple neuronal states is coarsely sampled. In process block 903, the state transition information on to a lookup table is mapped.

Figure 17:
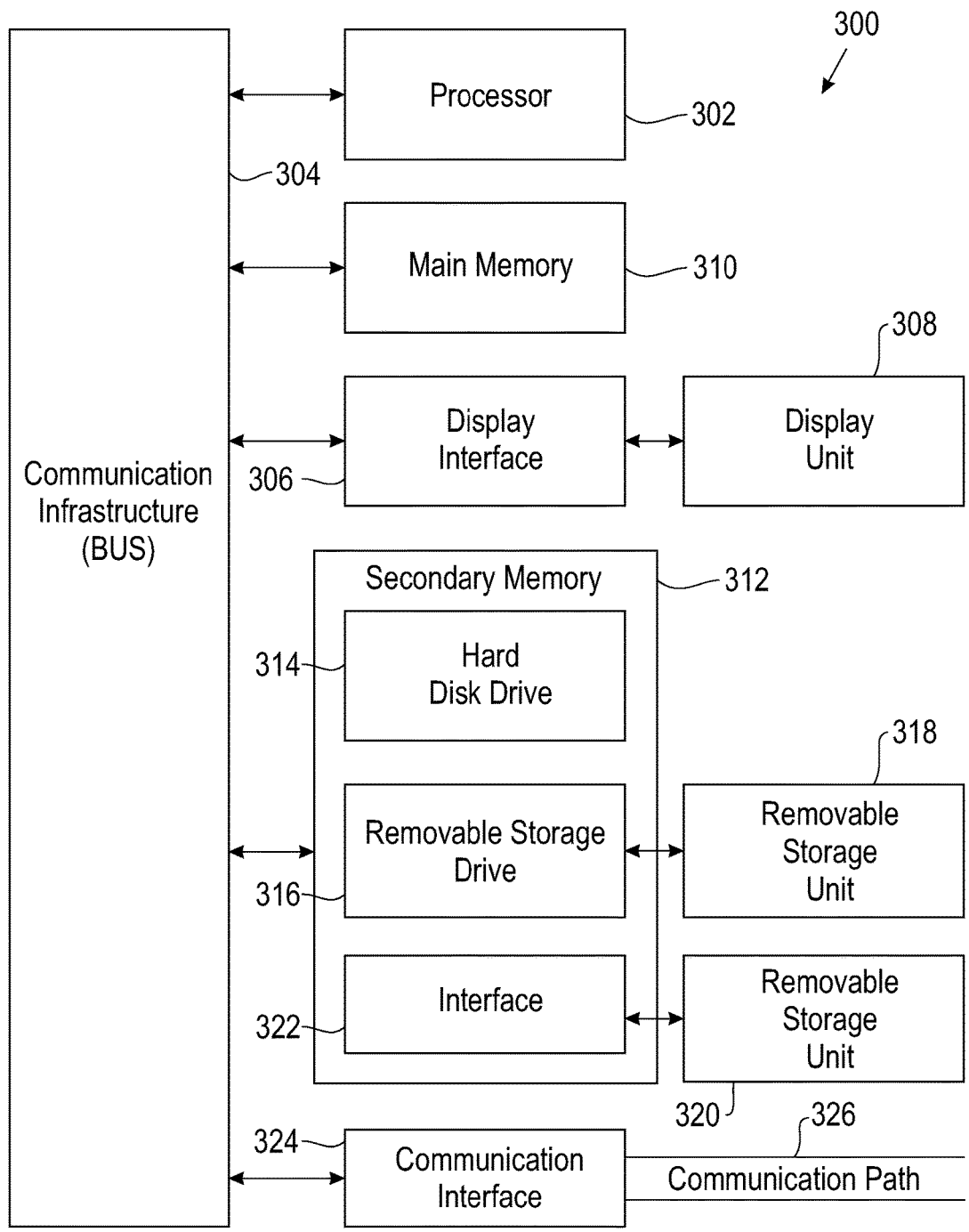
FIG. 17 is a high-level block diagram showing an information processing system useful for implementing one embodiment of the invention.

FIG. 17 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    at a neural network system configured to simulate a plurality of neurons of a neural model:
        maintaining, on a memory device of the neural network system, neuronal state information for the plurality of neurons, wherein the neuronal state information comprises, for each neuron, one or more corresponding variables representing a neuronal state of the neuron;
        maintaining, on a lookup table of the neural network system, state transition information for a sequence of neuronal states, wherein the state transition information indicates, for at least one neuronal state of the sequence of neuronal states, a subsequent neuronal state that the at least one neuronal state transitions to; and
        in response to a controller unit of the neural network system receiving a set of incoming firing events targeting the plurality of neurons, sequentially updating, via the controller unit, a neuronal state of each neuron of the plurality of neurons based on the neuronal state information, the state transition information, and the set of incoming firing events received.

2. The method of claim 1, wherein the state transition information comprises, for a neuronal state, one or more corresponding delta values.

3. The method of claim 2, wherein the sequentially updating comprises:
    for each incoming firing event of the set of incoming firing events received:
        reading, from the memory device, one or more variables corresponding to a target neuron;
        determining a current neuronal state of the target neuron based on the one or more variables;
        retrieving, from the lookup table, one or more delta values corresponding to the current neuronal state;
        updating the one or more variables based on the one or more delta values; and
        writing the one or more updated variables to the memory device.

4. The method of claim 3, wherein the sequentially updating further comprises:
    addressing the lookup table using the current neuronal state.

5. The method of claim 4, wherein the addressing comprises combining most significant bits of each of the one or more variables.

6. A system comprising a computer processor, a computer-readable hardware storage device, and program code embodied with the computer-readable hardware storage device for execution by the computer processor to implement a method for mapping neural dynamics of a neural model to a lookup table, the method comprising:
    at a neural network system configured to simulate a plurality of neurons of a neural model:
        maintaining, on a memory device of the neural network system, neuronal state information for the plurality of neurons, wherein the neuronal state information comprises, for each neuron, one or more corresponding variables representing a neuronal state of the neuron;
        maintaining, on a lookup table of the neural network system, state transition information for a sequence of neuronal states, wherein the state transition information indicates, for at least one neuronal state of the sequence of neuronal states, a subsequent neuronal state that the at least one neuronal state transitions to; and
        in response to a controller unit of the neural network system receiving a set of incoming firing events targeting the plurality of neurons, sequentially updating, via the controller unit, a neuronal state of each neuron of the plurality of neurons based on the neuronal state information, the state transition information, and the set of incoming firing events received.

7. The system of claim 6, wherein the state transition information comprises, for a neuronal state, one or more corresponding delta values.

8. The system of claim 7, wherein the sequentially updating comprises:
    for each incoming firing event of the set of incoming firing events received:
        reading, from the memory device, one or more variables corresponding to a target neuron;
        determining a current neuronal state of the target neuron based on the one or more variables;
        retrieving, from the lookup table, one or more delta values corresponding to the current neuronal state;
        updating the one or more variables based on the one or more delta values; and
        writing the one or more updated variables to the memory device.

9. The system of claim 8, wherein the sequentially updating further comprises:
   addressing the lookup table using the current neuronal state.

10. The system of claim 9, wherein the addressing comprises combining most significant bits of each of the one or more variables.

11. A computer program product comprising a computer-readable hardware storage device having program code embodied therewith, the program code being executable by a computer to implement a method for mapping neural dynamics of a neural model to a lookup table, the method comprising:
   at a neural network system configured to simulate a plurality of neurons of a neural model:
      maintaining, on a memory device of the neural network system, neuronal state information for the plurality of neurons, wherein the neuronal state information comprises, for each neuron, one or more corresponding variables representing a neuronal state of the neuron;
      maintaining, on a lookup table of the neural network system, state transition information for a sequence of neuronal states, wherein the state transition information indicates, for at least one neuronal state of the sequence of neuronal states, a subsequent neuronal state that the at least one neuronal state transitions to; and
   in response to a controller unit of the neural network system receiving a set of incoming firing events targeting the plurality of neurons, sequentially updating, via the controller unit, a neuronal state of each neuron of the plurality of neurons based on the neuronal state information, the state transition information, and the set of incoming firing events received.

12. The computer program product of claim 11, wherein the state transition information comprises, for a neuronal state, one or more corresponding delta values.

13. The computer program product of claim 12, wherein the sequentially updating comprises:
   for each incoming firing event of the set of incoming firing events received:
      reading, from the memory device, one or more variables corresponding to a target neuron;
      determining a current neuronal state of the target neuron based on the one or more variables;
      retrieving, from the lookup table, one or more delta values corresponding to the current neuronal state;
      updating the one or more variables based on the one or more delta values; and
      writing the one or more updated variables to the memory device.

14. The computer program product of claim 13, wherein the sequentially updating further comprises:
   addressing the lookup table using the current neuronal state.

15. The computer program product of claim 14, wherein the addressing comprises combining most significant bits of each of the one or more variables.

* * * * *